United States Patent
Destarac et al.

(10) Patent No.: US 7,728,088 B2
(45) Date of Patent: Jun. 1, 2010

(54) SYNTHESIS OF STATISTICAL MICROGELS BY MEANS OF CONTROLLED RADICAL POLYMERISATION

(75) Inventors: Mathias Destarac, Paris (FR); Bruno Bavouzet, Gentilly (FR); Daniel Taton, Camarsac (FR)

(73) Assignee: Rhodia Operations, Aubervilliers (FR)

( * ) Notice: Subject to any disclaimer, the term of this patent is extended or adjusted under 35 U.S.C. 154(b) by 1272 days.

(21) Appl. No.: 10/523,510

(22) PCT Filed: Jul. 21, 2003

(86) PCT No.: PCT/FR03/02303

§ 371 (c)(1),
(2), (4) Date: Oct. 3, 2005

(87) PCT Pub. No.: WO2004/014535

PCT Pub. Date: Feb. 19, 2004

(65) Prior Publication Data

US 2006/0106178 A1    May 18, 2006

(30) Foreign Application Priority Data

Aug. 6, 2002    (FR) .................................. 02 09987

(51) Int. Cl.
*C08F 4/72* (2006.01)
(52) U.S. Cl. ................. 526/222; 526/303.1; 526/317.1; 526/319; 526/346; 526/274; 526/279; 526/335; 526/318.43
(58) Field of Classification Search ................ 526/222, 526/303.1, 317.1, 319, 346, 274, 279, 335, 526/318.43
See application file for complete search history.

(56) References Cited

U.S. PATENT DOCUMENTS

| | | | |
|---|---|---|---|
| 6,153,705 A | 11/2000 | Corport et al. | |
| 6,545,098 B1 | 4/2003 | Bouhadir et al. | |
| 6,812,291 B1 | 11/2004 | Corpart et al. | |

FOREIGN PATENT DOCUMENTS

| | | | |
|---|---|---|---|
| FR | 2 773 161 A | | 7/1999 |
| WO | WO 96/30421 | | 10/1996 |
| WO | WO 98 01478 A | | 1/1998 |
| WO | WO 98/20050 | | 5/1998 |
| WO | WO 98/31739 | * | 7/1998 |
| WO | WO 98 31739 A | | 7/1998 |
| WO | WO 98/58974 | | 12/1998 |
| WO | WO 99/31144 | | 6/1999 |
| WO | WO 99/35177 | | 7/1999 |
| WO | WO 99/35178 | | 7/1999 |
| WO | WO 99/58588 | | 11/1999 |
| WO | WO 00/02939 | | 1/2000 |
| WO | WO 00/56792 | | 9/2000 |
| WO | WO 01/77198 | | 10/2001 |
| WO | WO 2004/048428 | | 6/2004 |
| WO | WO 2004/048429 | | 6/2004 |

OTHER PUBLICATIONS

International Search Report corresponding to WO 2004/014535 A3 mailed on Apr. 13, 2004.
International Preliminary Examination Report corresponding to PCT/FR2003/002303 dated Dec. 20, 2004 and English translation.

* cited by examiner

*Primary Examiner*—Robert D. Harlan
(74) *Attorney, Agent, or Firm*—Buchanan Ingersoll & Rooney PC

(57) ABSTRACT

The invention relates to a method of preparing statistical microgels. The inventive method comprises a step involving the radical polymerisation of a composition containing: at least one monoethylenically-unsaturated monomer, at least one multiethylenically-unsaturated monomer, a free radical source and a control agent. The invention also relates to first generation microgels thus prepared and all the compounds resulting from said microgels (next-generation microgels).

23 Claims, 1 Drawing Sheet

SYNTHESIS OF STATISTICAL MICROGELS BY MEANS OF CONTROLLED RADICAL POLYMERISATION

This application is an application under 35 U.S.C. Section 371 of International Application Number PCT/FR2003/002303, filed on Jul. 21, 2003.

The present invention relates to a novel radical polymerization process which gives access to random microgels and to the random microgels thus obtained.

Random microgels represent a particular class of polymers regarded as intermediate between the family of branched polymers and that of polymer networks which are macroscopically crosslinked, known as macrogels (Murray, M. J. and Snowden, M. J., Adv. Colloid Interface Sci., 1995, 54, 73). Thus, random macrogels may be defined as being a macroscopically soluble assembly of intramolecularly crosslinked macromolecules exhibiting a globular structure with a colloidal size typically of between 10 and 1000 nm (Funke, W., Adv. Polym. Sci., 1998, 136, 139) and with a molar mass of the order of $10^4$ to $10^6$ g.mol$^{-1}$. Other terms, including "microparticles", "microspherical hydrogels", "nanoparticles", "latex particles", and the like, have been proposed to describe the structure of random microgels.

In addition to their solubility in an appropriate solvent, mention may be made, among other advantages of random microgels with respect to macrogels, of their greater ease of purification by conventional precipitation techniques.

Microgels are known to have multiple properties, possibly different from those of the corresponding macrogels and linear homopolymers. For example, the viscosity in dilute solution of a microgel is lower than that of an equivalent polymer with a linear structure and the films formed from a random microgel exhibit better mechanical properties without the properties desired, such as, for example, the gloss or the durability, being affected (Ishikura, S. et al., Prog. Org. Coat., 1988, 15, 373).

Random microgels are used as additives to reduce the viscosity of solvent-based formulations or formulations in a molten medium (processing aid) or else to improve the impact strength of materials. Their use makes it possible to increase the solids content of these formulations with the advantage of reducing solvent emissions and maintaining the viscosity. Mention may be made, among the fields of application concerned, of paints, oil wells or wastewater treatment.

The processes for the preparation of these random microgels can be categorized into several groups. The first corresponds to the copolymerization in very dilute solution of a mixture of monomers comprising at least one crosslinking monomer (Staudinger, H. and Husemann, E., Chem. Ber., 1935, 68, 1618; Stöver, D. H. et al., Macromolecules, 2002, 35, 2728). In such a case, diluting promotes the intramolecular crosslinking reactions at the expense of the intermolecular crosslinking reactions which, for their part, result in the formation of an insoluble and infusible macrogel. Provision has also been made for a solution radical copolymerization process involving at least one crosslinking monomer in the presence of a chain-transfer agent of mercaptan type, so as to avoid the formation of the macrogel (Sherrington, D S. C., Polymer, 2000, 41).

The second method for the preparation of random macrogels consists in copolymerizing a mixture of monomers comprising at least one crosslinking monomer using an emulsion polymerization process (Antonietti, M., Angew. Chem. Int. Ed., 1988, 27, 1743). In this case, the intermolecular crosslinking reactions are restricted as a result of the compartmentalization in micelles of the macromolecules being formed.

Recourse is generally had to radical polymerization in order to obtain polymer chains connected to one another via crosslinking points resulting from the crosslinking monomer(s).

However, other methods for preparing random microgels have been developed, in particular that proceeding by means of ionic polymerization. Thus, the addition of the divinylbenzene used as coupling agent to "living" polystyrene chains prepared by solution anionic polymerization results in a star-shaped random microgel composed of a crosslinked core and of polystyrene arms around the central portion (Rempp, P. et al., Compt. Rend. Acad. Sci., 1966, 262, 726). Alternatively, the anionic polymerization in dilute solution of divinylbenzene results in a microgel carrying carbanionic sites from which it is possible to grow polystyrene chains in order to obtain a star-shaped polymer (Eschwey, H. and Burchard, W., Polymer, 1975, 16, 180). Other coupling agents have been used to obtain random microgels by anionic polymerization, in particular those based on chlorosilane groups (Antonietti, M. et al., Macromolecules, 1989, 22, 2802). More recently, star-shaped random microgels have been prepared by "living" cationic polymerization (Higashimura, T. et al., Macromolecules, 1996, 29, 1772).

Recently, a process for the synthesis of star-shaped random microgels from the coupling of linear polymer chains, preformed by controlled radical polymerization, with a polyethylenically unsaturated monomer has been proposed. The techniques used for this purpose may involve control agents, such as nitroxyls, used as counterradicals (T. Long, J. Polym. Sci. Part A.: Polym. Chem., 2001, 39, 216), transition metal complexes used in the Atom Transfer Radical Polymerization (ATRP) technology (Matyjaszewski, K., Macromolecules, 1999, 32, 4482) or else agents carrying thiocarbonylthio groups, such as dithioesters, in a reversible addition-fragmentation process (WO 00/0293). In this case, the reactivatable groups resulting from the linear precursors are found at the core of the star polymers thus formed.

In the continuation of the description, the terms "first-generation random microgels" and "second-generation random microgels" are used to respectively describe random microgels composed of a polymer comprising chain ends which can be activated by reversible transfer or by termination and the products composed of the first-generation random microgel at the core and of polymer arms extending from the chain ends which can be activated of said central portion.

Furthermore, the term "polymer comprising chain ends which can be activated" includes any polymer comprising one (or more) halogen or pseudohalogen group(s) which is obtained by ARTP, and also any polymer carrying a thiocarbonylthio group (dithiocarbamate, dithiocarbonate, trithiocarbonate, dithioester, thioether-thione, dithiocarbazate) at the chain end which is obtained by a reversible addition-fragmentation process.

Mention may be made, as an example illustrative of the ATRP process, of patent WO 96/30421. Patent applications WO 98/01478 on behalf of Dupont de Nemours and WO 99/35178 on behalf of Rhodia Chimie disclose the use of addition-fragmentation control (or reversible transfer) agents of dithioester RSC=SR' type for the synthesis of controlled-architecture copolymers. Another family of control agents, the xanthates RSC=SOR', has been disclosed in patent applications WO 98/58974, WO 00/75207 and WO 01/42312 of Rhodia Chimie as precursors of block copolymers. The control of radical polymerization by dithiocarbamates RS(C=S)

NR$_1$R$_2$ has also been disclosed recently in patent applications WO 99/35177 on behalf of Rhodia and WO 99/31144 on behalf of Dupont de Nemours. In addition, thioether-thione compounds have been disclosed as control agents for radical polymerization in patent application FR 2 794 464, filed on behalf of Rhodia Chimie. In addition, dithiocarbazate compounds have been disclosed as control agents for radical polymerization in patent application WO 02/26836, filed on behalf of Symyx.

A process for the preparation of random microgels by the controlled radical route employing nitroxyl radicals as control agent for the copolymerization of tert-butylstyrene and divinylbenzene has been disclosed (Solomon, *Polymer*, 2001, 42, 5987). However, this method is limited to the family of the styrene monomers and furthermore requires relatively high polymerization temperatures (110 to 130° C.).

One aim of the present invention is thus to provide a novel process for the synthesis of microgels by the controlled radical route which does not exhibit the disadvantages or limitations of the processes for the synthesis of random microgels provided to date.

Another aim of the invention is to provide a process for the synthesis of first-generation random microgels during which the degree of branching, the number-average molar masses and the density of surface reactive functional groups can be varied and consequently the shape and the size of said random microgels can be varied.

Another aim is to provide a controlled radical polymerization process which is simple to carry out and which makes it possible to result in random microgels of a higher generation starting from the first-generation random microgels.

Another aim is to provide a process which makes possible access to star-shaped second-generation random microgels, the branches of which comprise reactivatable groups at their ends. These groups can advantageously be modified so as to functionalize the arms of the star-shaped random microgels.

Another aim of the invention is to provide a process for the synthesis of random microgels of a higher generation than the first, during which the degree of branching, the number-average molar masses and the density of surface reactive functional groups can be varied and consequently the shape and the size of said random microgels can be varied.

Another aim is to provide a controlled radical polymerization process which can be applied to a very broad range of monomers, in comparison with the known techniques of the prior art.

In the context of the present invention, the synthesis of random microgels is carried out by resorting to the ATRP process or to the process involving thiocarbonylthio or thiophosphate control agents operating in a reversible addition-fragmentation process.

These aims and others are achieved by the present invention, which relates first of all to a process for the preparation of "first-generation" random microgels which comprises a stage of controlled radical polymerization of a composition comprising:
  at least one monoethylenically unsaturated monomer,
  at least one polyethylenically unsaturated monomer,
  a source of free radicals, and
  a control agent.

The ethylenically unsaturated monomers of use in the process of the present invention are all the monomers which polymerize in the presence of the control agent to give active polymer chains.

These ethylenically unsaturated monomers are, for example:

styrene and styrene derivatives, such as α-methylstyrene or vinyltoluene,
carboxylic acid vinyl esters, such as vinyl acetate, VINYL VERSATATE®, also known as vinyl neodecanoate, or vinyl propionate,
vinyl and vinylidene halides,
unsaturated ethylenic mono- and dicarboxylic acids, such as acrylic acid, methacrylic acid, itaconic acid, maleic acid or fumaric acid, and the monoalkyl esters of the dicarboxylic acids of the type mentioned with alkanols preferably having 1 to 4 carbon atoms and their N-substituted derivatives,
amides of unsaturated carboxylic acids, such as acrylamide, methacrylamide, N-methylolacrylamide, N-methylolmethacrylamide or N-alkylacrylamides,
ethylenic monomers comprising a sulfonic acid group and its alkali metal or ammonium salts, for example vinylsulfonic acid, vinylbenzenesulfonic acid, .alpha.-acrylamidomethylpropanesulfonic acid or 2-sulfoethylene methacrylate,
amides of vinylamine, in particular vinylformamide, vinylacetamide, N-vinylpyrrolidone and N-vinylcaprolactam,
unsaturated ethylenic monomers comprising a secondary, tertiary or quaternary amino group or a heterocyclic group comprising nitrogen, such as, for example, vinylpyridines, vinylimidazole, aminoalkyl (meth)acrylates and aminoalkyl(meth)acrylamides, such as dimethylaminoethyl acrylate, dimethylaminoethyl methacrylate, di(tert-butyl)aminoethyl acrylate, di(tert-butyl)aminoethyl methacrylate, dimethylaminomethylacrylamide or dimethylaminomethylmethacrylamide, or zwitterionic monomers, such as, for example, sulfopropyl(dimethyl)-aminopropyl acrylate,
(meth)acrylic esters, such as glycidyl acrylate or glycidyl methacrylate,
vinyl nitriles,
monomers comprising at least one boronate functional group or one precursor, for example chosen from acryloylbenzeneboronic acid, methacryloylbenzeneboronic acid, 4-vinylbenzene-boronic acid, 3-acrylamidophenylboronic acid or 3-methacrylamidophenylboronic acid, alone or as mixtures, or in the form of salts,
monomers comprising phosphonates, for example chosen from N-methacrylamidomethylphosphonic acid ester derivatives, in particular the n-propyl ester (RN 31857-11-1), the methyl ester (RN 31857-12-2), the ethyl ester (RN 31857-13-3), the n-butyl ester (RN 31857-14-4) or the isopropyl ester (RN 51239-00-0), and their phosphonic monoacid and diacid derivatives, such as N-methacrylamido-methylphosphonic diacid (RN 109421-20-7); N-methacrylamidoethylphosphonic acid ester derivatives, such as N-methacrylamidoethylphosphonic acid dimethyl ester (RN 266356-40-5) or N-methacrylamidoethylphosphonic acid di(2-butyl-3,3-dimethyl) ester (RN 266356-45-0), and their phosphonic monoacid and diacid derivatives, such as N-methacrylamidoethylphosphonic diacid (RN 80730-17-2); N-acrylamidomethylphosphonic acid ester derivatives, such as N-acrylamido-methylphosphonic acid dimethyl ester (RN 24610-95-5), N-acrylamidomethylphosphonic acid diethyl ester (RN 24610-96-6) or bis(2-chloropropyl) N-acrylamidomethylphosphonate (RN 50283-36-8), and their phosphonic monoacid and diacid derivatives, such as N-acrylamidomethylphosphonic acid (RN 151752-38-4); the vinylbenzylphosphonate dialkyl ester derivatives, in particular the di(n-propyl) (RN 60181-26-2), di(isopropyl) (RN 159358-34-6), diethyl (RN 726-61-4), dimethyl (RN 266356-24-5), di(2-butyl-3,3-dimethyl) (RN 266356-29-0) and di(t-butyl) (RN 159358-33-5) ester derivatives, and their phosphonic monoacid and diacid alternative forms, such as vinylbenzylphosphonic diacid (RN 53459-43-1); diethyl 2-(4-vinyl-phenyl)ethanephosphonate (RN 61737-88-0); dialkylphosphonoalkyl acrylate and methacrylate derivatives, such as 2-(acryloyloxy)ethyl-phosphonic acid dimethyl ester (RN 54731-78-1) and 2-(methacryloyloxy)ethylphosphonic acid dimethyl ester (RN 22432-83-3), 2-(methacryloyloxy)methyl-phosphonic acid diethyl ester (RN 60161-88-8), 2-(methacryloyloxy)methylphosphonic acid dimethyl ester (RN 63411-25-6), 2-(methacryloyloxy)propyl-phosphonic acid dimethyl ester (RN 252210-28-9), 2-(acryloyloxy)methylphosphonic acid diisopropyl ester (RN 51238-98-3) or 2-(acryloyloxy)ethyl-phosphonic acid diethyl ester (RN 20903-86-0), and their phosphonic monoacid and diacid alternative forms, such as 2-(methacryloyloxy)ethylphosphonic acid (RN 80730-17-2), 2-(methacryloyloxy)methyl-phosphonic acid (RN 87243-97-8), 2-(meth-acryloyloxy)propylphosphonic acid (RN 252210-30-3), 2-(acryloyloxy) propylphosphonic acid (RN 254103-47-4) and 2-(acryloyloxy)ethylphosphonic acid; vinylphosphonic acid, optionally substituted by cyano, phenyl, ester or acetate groups, vinylidenephosphonic acid, in the sodium salt form or the form of its isopropyl ester, or bis(2-chloro-ethyl)vinylphosphonate, it being possible for these monomers comprising a phosphonic mono- or diacid functional group to be used in the partially or completely neutralized form, optionally neutralized by an amine, for example dicyclohexylamine, monomers chosen from the phosphate analogs of the phosphonate-comprising monomers described above, the monomers then comprising a —C—O—P— sequence in comparison with the —C—P— sequence of the phosphonates, and monomers carrying an alkoxysilane group chosen from trimethoxysilypropyl methacrylate, triethoxysilylpropyl methacrylate, tributoxy-silylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilyl-propyl methacrylate, diisopropoxysilylpropyl methacrylate, trimethoxysilylpropyl methacrylate, triethoxysilylpropyl methacrylate, tributoxysilylpropyl methacrylate, trimethoxysilypropyl acrylate, triethoxysilyl-propyl acrylate, tributoxysilylpropyl acrylate, dimethoxymethylsilylpropyl acrylate, diethoxy-methylsilylpropyl acrylate, dibutoxymethylsilyl-propyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, trimethoxysilylpropyl acrylate, triethoxysilylpropyl acrylate or tributoxysilylpropyl acrylate.

The term "(meth)acrylic esters" denotes the esters of acrylic acid and of methacrylic acid with hydrogenated or fluorinated $C_1$-$C_{12}$ alcohols, preferably $C_1$-$C_8$ alcohols. Mention may be made, among the compounds of this type, of: methyl acrylate, ethyl acrylate, propyl acrylate, n-butyl acrylate, isobutyl acrylate, 2-ethylhexyl acrylate, t-butyl acrylate, methyl methacrylate, ethyl methacrylate, n-butyl methacrylate or isobutyl methacrylate.

The vinyl nitriles include more particularly those having from 3 to 12 carbon atoms, such as, in particular, acrylonitrile and methacrylonitrile.

Use is preferably made, for the preparation of a polyvinylamine block, as ethylenically unsaturated monomers, of amides of vinylamine, for example vinylformamide or vinylacetamide. The polymer obtained is then hydrolyzed at acidic or basic pH.

Use is preferably made, for the preparation of a poly(vinyl alcohol) block, as ethylenically unsaturated monomers, of carboxylic acid vinyl esters, such as, for example, vinyl acetate. The polymer obtained is then hydrolyzed at acidic or basic pH.

The ethylenically unsaturated monomers used in the preparation of the microgels are preferably chosen from styrene monomers, vinyl esters, neutral or charged hydrophilic acrylates, hydrophobic acrylates, neutral or charged hydrophilic methacrylates, hydrophobic methacrylates, hydrophilic or hydrophobic and neutral or charged acrylamido derivatives or hydrophilic or hydrophobic and neutral or charged methacrylamido derivatives.

The types and amounts of polymerizable monomers employed according the present invention vary according to the specific final application for which the polymer is intended. These variations are well known and can be easily determined by a person skilled in the art.

These ethylenically unsaturated monomers can be used alone or as mixtures.

The polyethylenically unsaturated monomers of use in the process of the present invention are all the monomers which polymerize in the presence of the control agent to give "first-generation" and "higher-generation" microgels.

The polyethylenically unsaturated monomers are chosen from organic compounds comprising at least two ethylenic unsaturations and at most 10 unsaturations and which are known as being reactive by the radical route.

Preferably, these monomers exhibit two or three ethylenic unsaturations.

Thus, mention may in particular be made of acrylic, methacrylic, acrylamido, methacrylamido, vinyl ester, vinyl ether, diene, styrene, α-methylstyrene and allyl derivatives. These monomers can also include functional groups other than ethylenic unsaturations, for example hydroxyl, carboxyl, ester, amide, amino, substituted amino, mercapto, silane, epoxy or halo functional groups.

The monomers belonging to these families are divinylbenzene and divinylbenzene derivatives, vinyl methacrylate, methacrylic acid anhydride, allyl methacrylate, ethylene glycol dimethacrylate, phenylene dimethacrylate, diethylene glycol dimethacrylate, triethylene glycol dimethacrylate, tetraethylene glycol dimethacrylate, polyethylene glycol 200 dimethacrylate, polyethylene glycol 400 dimethacrylate, 1,3-butanediol dimethacrylate, 1,4-butanediol dimethacrylate, 1,6-hexanediol dimethacrylate, 1,12-dodecanediol dimethacrylate, 1,3-glycerol dimethacrylate, diurethane dimethacrylate or trimethylolpropane trimethacrylate. For the family of the polyfunctional acrylates, mention may in particular be made of vinyl acrylate, bisphenol A epoxy diacrylate, dipropylene glycol diacrylate, tripropylene glycol diacrylate, polyethylene glycol 600 diacrylate, ethylene glycol diacrylate, diethylene glycol diacrylate, triethylene glycol diacrylate, tetraethylene glycol diacrylate, neopentyl glycol ethoxylate diacrylate, butanediol diacrylate, hexanediol diacrylate, aliphatic urethane diacrylate, trimethylolpropane triacrylate, trimethylolpropane ethoxylate triacrylate, trimethylolpropane propoxylate triacrylate, glycerol propoxylate triacrylate, aliphatic urethane triacrylate, trimethylolpropane tetraacrylate or dipentaerythritol pentaacrylate. As regards the vinyl ethers, mention may in particular be made of vinyl crotonate, diethylene glycol divinyl ether, 1,4-butanediol divinyl ether or triethylene glycol divinyl ether. For the allyl derivatives, mention may in particular be made of diallyl phthalate, diallyldimethylammonium chloride, diallyl maleate, sodium diallyloxyacetate, diallylphenylphosphine, diallyl pyrocarbonate, diallyl succinate, N,N'-diallyl-tartardiamide, N,N-diallyl-2,2,2-trifluoroacetamide, the allyl ester of diallyloxyacetic acid, 1,3-diallylurea, triallylamine, triallyl trimesate, triallyl cyanurate, triallyl trimellitate or 1,3,5-triallyltriazine-2,4,6(1H,3H,5H)-trione. For the acrylamido derivatives, mention may in particular be made of N,N'-methylenebisacrylamide, N,N'-methylenebismethacrylamide, glyoxalbisacrylamide or diacrylamidoacetic acid. As regards the styrene derivatives, mention may in particular be made of divinylbenzene and 1,3-diisopropenylbenzene. In the case of the diene monomers, mention may in particular be made of butadiene, chloroprene and isoprene.

Preference is given, as polyethylenically unsaturated monomers, to N,N'-methylenebisacrylamide, divinylbenzene, ethylene glycol diacrylate or trimethylolpropane triacrylate.

These polyethylenically unsaturated monomers can be used alone or as mixtures.

The types and amounts of polyethylenically unsaturated monomers employed according to the present invention vary according to the specific final application for which the random microgel is intended. These variations are easily determined by a person skilled in the art.

The molar fraction of polyethylenically unsaturated monomers with respect to the monoethylenically unsaturated monomers is between 0.001 and 1. Preferably, the molar fraction is between 0.01 and 1.

The process of the invention is in all cases carried out in the presence of a source of free radicals. However, for some monomers, such as styrene, the free radicals which make it possible to initiate the polymerization can be generated by the monoethylenically unsaturated monomer at sufficiently high temperatures, generally of greater than 100° C. It is not, in this case, necessary to add a source of additional free radicals.

In the case where a process according to the invention is carried out by living radical polymerization of reversible transfer by addition-fragmentation of thiocarbonylthio or thiophosphate compounds type, the source of free radicals which is of use is generally a radical polymerization initiator. The radical polymerization initiator can be chosen from the initiators conventionally used in radical polymerization. It can, for example, be one of the following initiators:

hydrogen peroxides, such as tertiary-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate or ammonium persulfate, azo compounds, such as: 2,2'-azobis(iso-butyronitrile), 2,2'-azobis(2-butanenitrile), 4,4'-azobis(4-pentanoic acid), 1,1'-azobis(cyclohexane-carbonitrile), 2-(t-butylazo)-2-cyanopropane, 2,2'-azobis[2-methyl-N-(1,1)-bis(hydroxymethyl)-2-hydroxyethyl)propionamide, 2,2'-azobis(2-methyl-N-hydroxyethyl]propionamide, 2,2'-azobis(N,N'-dimethylene-isobutyramidine) dichloride, 2,2'-azobis(2-amidino-propane)dichloride, 2,2'-azobis(N,N'-dimethylene-isobutyramide), 2,2'-azobis(2-methyl-N-[1,1-bis-(hydroxymethyl)-2-hydroxyethyl]propionamide), 2,2'-azobis(2-methyl-N-[1,1-bis(hydroxymethyl)ethyl]-propionamide), 2,2'-azobis[2-methyl-N-(2-hydroxyethyl)-propionamide] or 2,2'-azobis(isobutyramide) dihydrate, redox systems comprising combinations such as:

mixtures of hydrogen peroxide, alkyl peroxide, peresters, percarbonates and the like and of any of the iron salts, titanous salts, zinc formaldehydesulfoxylate or sodium formaldehydesulfoxylate, and reducing sugars, alkali metal or ammonium persulfates, perborates or perchlorates, in combination with an alkali metal bisulfite, such as sodium metabisulfite, and reducing sugars, and alkali metal persulfates in combination with an arylphosphinic acid, such as benzenephosphonic acid and other similar compounds, and reducing sugars.

According to one embodiment for the process for the preparation of random microgels according to the invention, the amount of initiator to be used is determined so that the amount of radicals generated is at most 50 mol %, preferably at most 20 mol %, with respect to the amount of control agent.

Mention may in particular be made, among the control agents which can be used in the radical polymerization by a process of reversible transfer by addition-fragmentation of thiocarbonylthio compounds type to prepare the first-generation microgel, of reversible addition-fragmentation agents of dithioester type of formula RSC=SR', as disclosed in patent applications WO 98/01478 and WO 99/35178, xanthates RSC=SOR', as disclosed in patent applications WO 98/58974, WO 00/75207 and WO 01/42312, dithiocarbamates of formula RS(C=S)NR$_1$R$_2$, such as those disclosed in patent applications WO 99/35177 and WO 99/31144, thioether-thione compounds, such as those disclosed in patent application FR 2 794 464, filed on behalf of Rhodia Chimie, or dithiocarbazate compounds, such as those disclosed in patent application WO 02/26836, filed on behalf of Symyx.

Thus, the control agents which can be used in the radical polymerization by a process of reversible transfer by addition-fragmentation of thiocarbonylthio compounds type are compounds which can be of following formula (A):

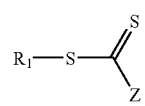

(A)

in which:
Z represents:
a hydrogen atom,
a chlorine atom,
an optionally substituted alkyl radical or an optionally substituted aryl radical,
an optionally substituted heterocycle,
an optionally substituted alkylthio radical,
an optionally substituted arylthio radical,
an optionally substituted alkoxy radical,
an optionally substituted aryloxy radical,
an optionally substituted amino radical,
an optionally substituted hydrazine radical,
an optionally substituted alkoxycarbonyl radical,
an optionally substituted aryloxycarbonyl radical,
a carboxyl or optionally substituted acyloxy radical,
an optionally substituted aroyloxy radical, an optionally substituted carbamoyl radical,
a cyano radical,
a dialkyl- or diaryl-phosphonato radical,
a dialkyl-phosphinato or diaryl-phosphinato radical, or
a polymer chain,
$R_1$ represents:
    an optionally substituted alkyl, acyl, aryl, aralkyl, alkenyl or alkynyl group,
    an optionally substituted, aromatic, saturated or unsaturated, carbon ring or heterocycle,
    a polymer chain.

The $R_1$ or Z groups, when they are substituted, can be substituted by optionally substituted phenyl groups, optionally substituted aromatic groups, saturated or unsaturated carbon rings, saturated or unsaturated heterocycles, or the following groups: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidino, hydroxyl (—OH), amino (—NR$_2$), halogen, perfluoroalkyl $C_nF_{2n+1}$, allyl, epoxy, alkoxy (—OR), S-alkyl, S-aryl, groups exhibiting a hydrophilic or ionic nature, such as alkaline salts of carboxylic acids or alkaline salts of sulfonic acids, poly(alkylene oxide) (PEO, PPO) chains, cationic substituents (quaternary ammonium salts), R representing an alkyl or aryl group, or a polymer chain.

According to a specific embodiment, $R_1$ is a substituted or unsubstituted, preferably substituted, alkyl group.

The compounds (A) of use in the present invention are, for example, the compounds in which $R_1$ is chosen from:
—CH$_2$C$_6$H$_5$
—CH(CH$_3$)(CO$_2$Et)
—CH(CH$_3$)(C$_6$H$_5$)
—CH(CO$_2$Et)$_2$
—C(CH$_3$)(CO$_2$Et)(S—C$_6$H$_5$)
—C(CH$_3$)$_2$(C$_6$H$_5$)
—C(CH$_3$)$_2$CN

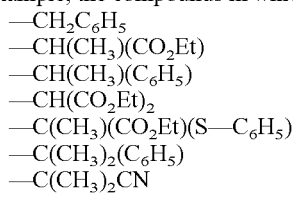

in which Et represents an ethyl group and Ph represents a phenyl group.

The optionally substituted alkyl, acyl, aryl, aralkyl or alkynyl groups generally exhibit 1 to 20 carbon atoms, preferably 1 to 12 carbon atoms and more preferably 1 to 9 carbon atoms. They can be linear or branched. They can also be substituted by oxygen atoms, in the form in particular of esters, sulfur atoms or nitrogen atoms.

Mention may in particular be made, among alkyl radicals, of the methyl, ethyl, propyl, butyl, pentyl, isopropyl, tert-butyl, pentyl, hexyl, octyl, decyl or dodecyl radicals.

The alkynyl groups are radicals generally of 2 to 10 carbon atoms; they exhibit at least one ethylenic unsaturation, such as the acetylenyl radical.

The acyl group is a radical generally exhibiting from 1 to 20 carbon atoms with a carbonyl group.

Mention may in particular be made, among aryl radicals, of the optionally substituted phenyl radical, in particular substituted by a nitro or hydroxyl functional group.

Mention may in particular be made, among aralkyl radicals, of the optionally substituted benzyl or phenethyl radical, in particular substituted by a nitro or hydroxyl functional group.

When $R_1$ or Z is a polymer chain, this polymer chain can result from a radical or ionic polymerization or can result from a polycondensation.

In the context of the present invention, preference is given to the following control agents: xanthate, dithiocarbamate, dithioester and dithiocarbazate compounds.

Use is advantageously made, as control agent, of xanthate compounds.

When the first-generation random microgels composed of polymers comprising halogen or pseudohalogen chain ends are obtained by the *Atom Transfer Radical Polymerization* (ATRP) process, the control agent of the polymerization is a transition metal in combination with a ligand acting as catalyst of the polymerization.

Mention may be made, as examples of transition metal in combination with a ligand acting as catalyst for the polymerization, of the complexes of the following types: CuX/2,2'-bipyridyl, CuX/Schiff base, CuX/N-alkyl-2-pyridylmethanimine, CuX/tris[2-(dimethylamino)-ethyl]amine, CuX/N,N,N',N'',N''-pentamethyldiethylenetri-amine, CuX/tris[(2-pyridyl)methyl]amine, Mn(CO)$_6$, RuX$_x$(PPh$_3$)$_3$, NiX[(o-o'-CH$_2$NMe$_2$)$_2$C$_6$H$_3$], RhX(PPh$_3$)$_3$, NiX$_2$(PPh$_3$)$_2$ and FeX$_2$/P(n-Bu)$_3$, where X is a halogen or a pseudohalogen.

An aluminum trialkoxide Al(OR)$_3$ can be employed as additive to activate the polymerization.

A detailed list of transition metals and associated ligands is disclosed in the document WO 96/30421, from page 22, line 6, to page 26, line 8.

BRIEF DESCRIPTION OF THE DRAWINGS

The assumed mechanism of the ATRP process is shown in the scheme presented in FIG. 1.

The metal complex (Mt$^n$X) captures the halogen atom of the organic halide (R—X) to form the R. radical and the oxidized metallic entity Mt$^{n+1}$X$_2$. In the following stage, R. reacts with the monomer M to form a new radical active entity RM.

Figure 1:
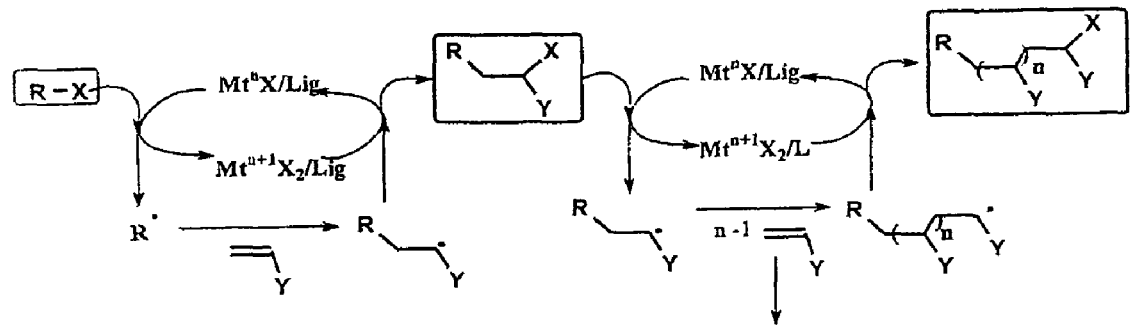

The reaction between RM. and Mt$^{n+1}$X$_2$ results in the formation of a potentially reactivatable entity RMX and, at the same time, the metallic compound in its reduced form Mt$^n$X. The latter can again react with RX and can promote a new redox cycle.

In the presence of a large excess of monomer M, the RM$_n$X entities are sufficiently reactive with respect to the Mt$^n$X complex to promote a certain number of activation/deactivation cycles, that is to say a "living" or controlled radical polymerization reaction.

Details with regard to the mechanism of this process are described in the document *Macromolecules*, 1995, 28, 7901.

In the case where a process according to the invention via living radical polymerization of ATRP type is employed, the source of free radicals which is of use is generally an organic halide activated by the redox route.

The organic halides acting as source of free radicals in the ATRP process are, for example:
    an arenesulfonyl halide or alkanesulfonyl halide of formula RSO$_2$X, where X is a chlorine atom, a bromine atom or an iodine atom and R is an aryl, alkyl, substituted alkyl or substituted aryl group. A list of the R groups which come within the scope of the invention is given, for example, in the document WO 98/20050.

a halide of formula R'X, where X is generally a chlorine atom, a bromine atom or an iodine atom and R' is an aryl, alkyl, substituted alkyl, substituted aryl or cycloalkyl group. A list of the R' groups which come within the invention is given, for example, in the document WO 96/30421, from page 19, line 20, to page 22, line 5, which is incorporated by reference.

Preferably, the controlled radical polymerization according to the invention is carried out according to a reversible transfer by addition-fragmentation of thiocarbonylthio compounds process.

Another subject matter of the invention is a process for the preparation of "second-generation" random microgels which comprises an additional stage with respect to the preceding process consisting in adding, to the microgel obtained in stage 1, at least one mono- or polyethylenically unsaturated monomer in the presence of an activator.

The activator depends on the method of controlled radical polymerization used.

When use is made of a controlled radical polymerization process of reversible transfer by addition-fragmentation of thiocarbonylthio compounds type, then the activator is a source of free radicals as is defined above.

When use is made of a controlled radical polymerization process of ATRP type, then the activator is an organometallic catalyst.

This process results in the formation of homopolymers or block copolymers starting from the points of attachment of the control agents to the first-generation microgel, which constitute the arms of the second-generation microgel.

Preferably, the monomer used in stage 2 is a monoethylenically unsaturated monomer as defined above.

Preferably, the controlled radical polymerization process used in stage 2 is of reversible transfer by addition-fragmentation of thiocarbonylthio compounds type.

Another subject-matter of the invention is a process for the preparation of "nth-generation" random microgels, which comprises an additional stage with respect to the process for the preparation of "(n−1)th-generation" random microgels, consisting in adding, to the (n−1)th-generation microgel obtained, at least one mono- or polyethylenically unsaturated monomer in the presence of an activator as defined above.

n is an integer between 2 and 50, preferably between 2 and 10 and more preferably still between 2 and 5.

Preferably, the monomer used in stage n is a monoethylenically unsaturated monomer as defined above.

Preferably, the controlled radical polymerization process used in stage n is of reversible transfer by addition-fragmentation of thiocarbonylthio compounds type.

The process according to the invention can be carried out under bulk, solution, emulsion, dispersion or suspension conditions. Preferably, it is carried out under solution or emulsion conditions.

When it is carried out under solution, emulsion, dispersion or suspension conditions, the solids content can be between 0.1% and 99%. The solids content is advantageously between 1 and 70% by weight, more advantageously still between 4 and 50% by weight.

The temperature can vary between ambient temperature and 150° C. depending on the nature of the source of free radicals and of the control agents used.

Generally, the process is carried out in the absence of a UV source, by thermal initiation in the case of a controlled radical polymerization process of reversible transfer by addition-fragmentation of thiocarbonylthio compounds type or by redox initiation in the case of a controlled radical polymerization process of ATRP type.

It is possible to adjust the properties of the microgels obtained by selecting specific monomers comprising ethylenic unsaturation and by choosing the order or the method of introduction or the respective amounts of the monomers introduced.

For example, in the case of relatively unreactive control agents, it may be advantageous to introduce the monomer or monomers continuously.

It is possible, by way of example, to provide combinations of neutral hydrophilic monomers with charged hydrophilic monomers exhibiting either positive charges or negative charges.

It is also possible to provide combinations of hydrophilic monomers with hydrophobic monomers.

It is also possible to provide combinations of hard hydrophobic monomers with soft hydrophobic monomers.

The term "hard monomer" is understood to mean a monomer resulting in a polymer with a glass transition temperature of greater than 20° C.

The term "soft monomer" is understood to mean a monomer resulting in a polymer with a glass transition temperature of less than 20° C.

It is also possible to vary the degree of branching, the number-average molar masses and the density of surface reactive functional groups and consequently the shape and the size of said random microgels.

These molecular characteristics can be obtained by varying a certain number of experimental parameters, including the concentration of the reaction medium, the nature of the polymerization solvent, the proportion and the chemical nature of the polyethylenically unsaturated monomer, the proportion and the chemical nature of the control agent or the polymerization temperature.

Another subject matter of the present invention is the microgels capable of being obtained by any one of the processes described above.

Another subject matter of the present invention is star-shaped polymers capable of being obtained by a process for the preparation of an nth-generation microgel, with n between 2 and 50, when the monomer(s) used in stage n is or are (a) monoethylenically unsatured monomer(s).

Thus, these star polymers are characterized in that they exhibit (1) a central portion in the form of a first-generation microgel based on a crosslinked polymer resulting from the polymerization of the mono- and polyethylenically unsaturated monomers and (2) arms composed of the monoethylenically unsaturated monomers only added starting from stage 2 as defined above and comprising, at their end, the active part of the control agent (—S(C=S)— functional group), in the case of a controlled radical polymerization process of reversible transfer by addition-fragmentation of thiocarbonylthio compounds type, or the halogen or pseudohalogen part, in the case of a controlled radical polymerization process of ATRP type.

Whatever the generation of the microgel, the active part of the control agent (—S(C=S)— functional group), in the case of a controlled radical polymerization process of reversible transfer by addition-fragmentation of thiocarbonylthio compounds type, can be substituted in all or part by a hydrogen atom or a thiol functional group by employing processes known to a person skilled in the art.

These processes consists of a cleavage stage, such as in particular that disclosed in the document WO 02/090424 and in Mori et al. in J. Org. Chem., 34, 12, 1969, 4170 (conversion of xanthate to thiol), or alternatively that disclosed by Udding et al. in the document WO 02/090397 and in J. Org. Chem., 59, 1994, 6671 (conversion to the hydrogen atom).

The microgels according to the invention then exhibit chain ends based on hydrogen atoms or on thiol functional groups, substituting in all or part for the active part (—S(C=S)— functional group) of the control agent.

The halogen chain ends resulting from the ATRP process can also be modified chemically in various ways. Mention may be made, for example, of the dehydrohalogenation reaction in the presence of an unsaturated compound disclosed in patent WO 99/54365, which generates an unsaturation at the chain end. The halogen end can also be converted to other functional groups, for example by nucleophilic substitution or electrophilic addition or alternatively by radical addition. All these techniques for the conversion of halogen chain ends are described in the document "Progress in Polymer Science (2001), 26(3), 337".

The following examples illustrate the invention without, however, limiting the scope thereof.

EXAMPLES

In the examples given below, the polymerization reactions are carried out under gentle flushing with nitrogen in glass reactors immersed in an oil bath preheated to a given temperature. The reactants are introduced in the following order: control agent, solvent, ethylenically unsaturated monomer (s), polyethylenically unsaturated monomer(s) and initiator. Azobis(4,4'-cyanopentanoic acid) (ACP) is used as generator of free radicals in the case where the polymerizations are carried out according to the process using control agents carrying thiocarbonylthio groups or thiophosphate groups. The conversion of the monomer is evaluated by gravimetry or, if appropriate, by HPLC. The analysis of the (co)polymers is carried out by steric exclusion chromatography (SEC) using either THF or a water/acetonitrile (80%/20% by vol.) mixture as elution solvent. The number-average molar masses ($M_n$) and the weight-average molar masses ($M_w$) (g.mol$^{-1}$), expressed as polystyrene or poly(ethylene oxide) equivalents, and the distribution of the molar masses, evaluated by the polydispersity index ($I_p$) corresponding to the $M_w/M_n$ ratio, are given here by way of indication.

These examples demonstrate that the use of appropriate amounts of the control agent makes it possible to obtain polymers which are soluble in the polymerization solvent, in comparison with the control experiments involving the same reactants with the exception of the control agent. In fact, in this case, an insoluble gel is obtained. The control of the polymerization is demonstrated in particular by the fact that the first-generation random microgels can be reactivated, acting as polyfunctional cores during a subsequent polymerization stage. This makes it possible to generate second-generation random microgels composed of the core based on the first-generation random microgel and of polymer arms, the number-average molar mass of which increases with the degree of conversion of the monomer.

Example 1

Synthesis of Random Microgels Based on Polyacrylamide which is Prepared from the Control Agent EtOC(=S)SCH(CH$_3$)COOCH$_3$ The polymerizations of the acrylamide are carried out at 70° C. in the presence of N-methylene(bisacrylamide) (MBA) and of ACP for 4 hours.

Example 1.1

0.355 g (1.71×10$^{-3}$ mol) of the xanthate EtOC(=S)SCH(CH$_3$)COOCH$_3$, 2.37 g (0.0333 mol) of acrylamide, 0.053 g (3.44×10$^{-4}$ mol) of MBA and 0.099 g (3.53×10$^{-4}$ mol) of ACP in a mixture comprising 9.1 g of deionized water and 2.3 g of isopropanol are added. After reacting at 70° C. for 4 hours, the characterization of the crude product by SEC in the aqueous eluent shows the absence of residual monomers and the presence of a predominant population with a molar mass at the tip of the peak corresponding to $M_n$=1650 g.mol$^{-1}$.

Example 1.2

0.297 g (1.42×10$^{-3}$ mol) of the xanthate EtOC(=S)SCH(CH$_3$)COOCH$_3$, 1.03 g (0.0142 mol) of acrylamide, 0.106 g (6.8×10$^{-4}$ mol) of MBA and 0.070 g (2.5×10$^{-4}$ mol) of ACP in a mixture comprising 4.2 g of deionized water and 1.05 g of isopropanol are added. After reacting at 70° C. for 4 hours, the characterization of the crude product by SEC in the aqueous eluent shows the absence of residual monomers. The SEC analysis results in the following values: $M_n$=1550 g.mol$^{-1}$ and $I_p$=3.45.

Example 1.3

0.047 g (2.25×10$^{-4}$ mol) of the xanthate EtOC(=S)SCH(CH$_3$)COOCH$_3$, 1.64 g (0.0231 mol) of acrylamide, 0.036 g (2.33×10$^{-4}$ mol) of MBA and 0.030 g (1.07×10$^{-4}$ mol) of ACP in a mixture comprising 6.7 g of deionized water and 1.7 g of isopropanol are added. After reacting at 70° C. for 4 hours, a soluble product is obtained, the characterization of which by SEC in the aqueous eluent shows the absence of residual monomers.

Example 1.4

0.047 g (2.25×10$^{-4}$ mol) of the xanthate EtOC(=S)SCH(CH$_3$)COOCH$_3$, 1.64 g (0.0231 mol) of acrylamide, 0.070 g (4.54×10$^{-4}$ mol) of MBA and 0.030 g (1.07×10$^{-4}$ mol) of ACP in a mixture comprising 6.7 g of deionized water and 1.7 g of isopropanol are added. After reacting at 70° C. for 4 hours, the characterization of the crude product by SEC in the aqueous eluent shows the absence of residual monomers. The SEC analysis results in the following values: $M_n$=6990 g.mol$^{-1}$ and $I_p$=22.3.

The examples which follow relate to the synthesis of second-generation random microgels starting from an aqueous solution of a first-generation random microgel described in examples 1.1 to 1.4. The polymerizations are carried out at 70° C. for 15 hours, the concentration of the solution being adjusted by addition of deionized water and with variable amounts of acrylic acid and of ACP being added. In these examples, the controlled nature of the polymerization reaction is demonstrated by the fact that the molar mass of the polymers increases as the amount of acrylic acid added increases. It should be noted that the viscosities of the solutions obtained increase with increasing amounts of acrylic acid added.

Example 1.5

0.34 g (4.72×10$^{-3}$ mol) of acrylic acid, 0.7 g of deionized water and 0.030 g (1.10×10$^{-4}$ mol) are added to 2.21 g of the solution of the polymer obtained in example 1.1 described above. A water-soluble product is obtained, the characterization of which by SEC in the eluent results in the following values: $M_n$=3610 g.mol$^{-1}$ and $I_p$=2.42.

Example 1.6

0.76 g (1.05×10$^{-2}$ mol) of acrylic acid, 1.1 g of deionized water and 0.030 g (1.10×10$^{-4}$ mol) are added to 2.08 g of the solution of the polymer obtained in example 1.3 described above. A water-soluble product is obtained, the characterization of which by SEC in the eluent results in the following values: $M_n$=5080 g.mol$^{-1}$ and $I_p$=3.02.

Example 1.7

1.44 g (2.0×10$^{-2}$ mol) of acrylic acid, 1.8 g of deionized water and 0.030 g (1.10×10$^{-4}$ mol) are added to 2.04 g of the solution of the polymer obtained in example 1.1 described above. A water-soluble product is obtained, the characterization of which by SEC in the eluent results in the following values: $M_n$=8400 g.mol$^{-1}$ and $I_p$=3.37.

Example 1.8

2.58 g (3.58×10$^{-2}$ mol) of acrylic acid, 2.9 g of deionized water and 0.030 g (1.10×10$^{-4}$ mol) are added to 2.14 g of the solution of the polymer obtained in example 1.1 described above. A water-soluble product is obtained, the characterization of which by SEC in the eluent results in the following values: $M_n$=13 600 g.mol$^{-1}$ and $I_p$=11.29.

Example 1.9

0.48 g (6.66×10$^{-3}$ mol) of acrylic acid, 0.8 g of deionized water and 0.005 g (1.78×10$^{-5}$ mol) are added to 2.02 g of the solution of the polymer obtained in example 1.3 described above. A water-soluble product is obtained, the characterization of which by SEC in the eluent results in the following values: $M_n$=5620 g.mol$^{-1}$ and $I_p$=2.77.

Example 1.10

0.66 g (9.16×10$^{-3}$ mol) of acrylic acid, 1 g of deionized water and 0.005 g (1.78×10$^{-5}$ mol) are added to 2.16 g of the solution of the polymer obtained in example 1.3 described above. A water-soluble product is obtained, the characterization of which by SEC in the eluent results in the following values: $M_n$=7660 g.mol$^{-1}$ and $I_p$=3.25.

Example 1.11

1.31 g (1.81×10$^{-2}$ mol) of acrylic acid, 1.63 g of deionized water and 0.005 g (1.78×10$^{-5}$ mol) are added to 2.05 g of the solution of the polymer obtained in example 1.3 described above. A water-soluble product is obtained, the characterization of which by SEC in the eluent results in the following values: $M_n$=11 240 g.mol$^{-1}$ and $I_p$=3.87.

Example 1.12

2.54 g (3.52×10$^{-2}$ mol) of acrylic acid, 2.86 g of deionized water and 0.005 g (1.78×10$^{-5}$ mol) are added to 2.09 g of the solution of the polymer obtained in example 1.3 described above. A water-soluble product is obtained, the characterization of which by SEC in the eluent results in the following values: $M_n$=13 780 g.mol$^{-1}$ and $I_p$=5.90.

Example 2

Synthesis of Random Microgels Based on Butyl Acrylate which is Prepared from the Control Agent EtOC(=S)SCH(CH$_3$)COOCH$_3$ The polymerizations of the butyl acrylate are carried out at 75° C. in the presence of MBA and of 2,2'-azobis-(2-methylbutyronitrile) (AMBN).

Example 2.1

0.625 g (3.0×10$^{-3}$ mol) of the xanthate EtOC(=S)SCH(CH$_3$)COOCH$_3$, 15 g (0.117 mol) of butyl acrylate, 1.386 g (9×10$^{-3}$ mol) of MBA and 0.1154 g (6.0×10$^{-4}$ mol) of AMBN in 113 ml of ethanol are added. After reacting at 75° C. for 5 hours, 0.0577 g (3.0×10$^{-4}$ mol) of AMBN is added to the reaction medium. After heating for a further 5 hours, the characterization of the crude product by SEC in the THF eluent shows the absence of residual monomers. The SEC analysis results in the following values: $M_n$=9100 g.mol$^{-1}$ and $I_p$=3.2.

The examples which follow relate to the synthesis of second-generation random microgels starting from the solution of a first-generation random microgel described in example 2.1. The polymerization is carried out at 75° C. for 10 hours, the concentration of the solution being adjusted by addition of ethanol and with variable amounts of butyl acrylate and of AMBN being added. In these examples, the controlled nature of the polymerization reaction is demonstrated by the fact that the molar mass of the polymers increases as the amount of butyl acrylate added increases. It should be noted that the viscosities of the solutions obtained increase with increasing amounts of butyl acrylate.

Example 2.2

12 g (9.36×10$^{-2}$ mol) of butyl acrylate, 0.0154 g (8.0×10$^{-5}$ mol) of AMBN and 17.53 of ethanol are added continuously over a period of 2 hours to 18.074 g of the polymer solution obtained in example 2.1, which will have been heated beforehand to 75° C. At the end of the continuous addition, heating is maintained for a further 4 hours before the addition of 7.690×10$^{-3}$ mol) (4.0×10$^{-5}$ g) of AMBN. After finally heating for a further 4 hours, the product obtained is analyzed by SEC in the THF eluent and results in the following values: $M_n$=36 900 g.mol$^{-1}$ and $I_p$=2.9.

Example 2.3

24 g (1.873×10$^{-1}$ mol) of butyl acrylate, 0.0154 g (8.0×10$^{-5}$ mol) of AMBN and 45.54 of ethanol are added continuously over a period of 2 hours to 18.074 g of the polymer solution obtained in example 2.1, which will have been heated beforehand to 75° C. At the end of the continuous addition, heating is maintained for a further 4 hours before the addition of 7.690×10$^{-3}$ g) (4.0×10$^{-5}$ mol) of AMBN. After finally heating for a further 4 hours, the product obtained is analyzed by SEC in the THF eluent and results in the following values: $M_n$=48 600 g.mol$^{-1}$ and $I_p$=2.6.

The invention claimed is:
1. A process for the preparation of first generation random microgels comprising a step of controlled radical polymerization of a composition comprising at least one monoethylenically unsaturated monomer, at least one polyethylenically unsaturated monomer, a source of free radicals, and a control agent, wherein said first generation random microgels comprise a polymer having chain ends which can be activated by reversible transfer or by termination, said polymer comprising one or more thiocarbonylthio groups.

2. The process as claimed in claim 1, wherein the monoethylenically unsaturated monomer is:
styrene derivatives,
carboxylic acid vinyl esters,
vinyl halides, vinylidene halides,
unsaturated ethylenic monocarboxylic acids, unsaturated ethylenic dicarboxylic acids, the monoalkyl esters thereof with alkanols having 1 to 4 carbon atoms, optionally N-substituted,
amides of unsaturated carboxylic acids,
ethylenic monomers having a sulfonic acid group, an alkali metal or ammonium salts thereof,
amides of vinylamine,
unsaturated ethylenic monomers having a secondary, tertiary or quaternary amino group or a heterocyclic group having nitrogen, aminoalkyl (meth)acrylates,
aminoalkyl(meth)acrylamides, zwitterionic monomers, (meth)acrylic esters,
vinyl nitriles,
monomers having at least one boronate functional group or a precursor thereof, phosphonates monomers comprising, N-methacrylamidomethylphosphonic acid ester derivatives,
phosphate monomers, monomers having a —C—O—P— sequence in comparison with the —C—P— sequence of the phosphonates, and
monomers carrying an alkoxysilane group selected from the group consisting of trimethoxysilylpropyl methacrylate, triethoxysilylpropyl methacrylate, tributoxy-silylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl methacrylate, triethoxysilylpropyl meth-acrylate, tributoxysilylpropyl methacrylate, trimethoxysilypropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, trimethoxysilylpropyl acrylate, triethoxysilylpropyl acrylate and tributoxysilylpropyl acrylate.

3. The process as claimed in claim 2, wherein the monoethylenically unsaturated monomer is:
α-methylstyrene, vinyltoluene,
vinyl acetate, vinyl neodecanoate, vinyl propionate,
acrylic acid, methacrylic acid, itaconic acid, maleic acid, fumaric acid,
acrylamide, methacrylamide, N-methylolacrylamide, N-methylolmethacrylamide, N-alkylacrylamides,
vinylsulfonic acid, vinylbenzenesulfonic acid, α-acrylamidomethylpropanesulfonic acid, 2-sulfoethylene methacrylate,
vinylformamide, vinylacetamide, N-vinylpyrrolidone, N-vinylcaprolactam, vinylpyridine, vinylimidazole, dimethylaminoethyl acrylate, dimethylaminoethyl methacrylate, di(tert-butyl)aminoethyl acrylate, di(tert-butyl)aminoethyl methacrylate, dimethylaminomethylacrylamide, dimethylaminomethylmethacrylamide, sulfopropyl(dimethyl)aminopropyl acrylate,
glycidyl acrylate, glycidyl methacrylate,
vinyl nitriles,
acryloylbenzeneboronic acid, methacryloylbenzeneboronic acid, 4-vinylbenzene-boronic acid, 3-acrylamidophenylboronic acid, 3-methacrylamidophenylboronic acid, alone or as mixtures, or in the form of salts,
n-propyl ester of N-methacrylamidomethylphosphonic acid, methyl ester of N-methacrylamidomethylphosphonic acid, ethyl ester of N-methacrylamidomethylphosphonic acid, n-butyl ester of N-methacrylamidomethylphosphonic acid, isopropyl ester of N-methacrylamidomethylphosphonic acid,
N-methacrylamidomethylphosphonic diacid; N-methacrylamidoethylphosphonic acid dimethyl ester, N-methacrylamido-ethylphosphonic acid di(2-butyl-3, 3-dimethyl) ester, N-methacrylamidoethylphosphonic diacid, N-acrylamidomethylphosphonic acid dimethyl ester, N-acrylamidomethylphosphonic acid diethyl ester, bis(2-chloropropyl) N-acrylamidomethylphosphonate, (N-acrylamidomethylphosphonic acid, di(n-propyl) vinylbenzylphosphonate dialkyl ester, di(isopropyl) vinylbenzylphosphonate dialkyl ester, diethyl vinylbenzylphosphonate dialkyl ester, dimethyl vinylbenzylphosphonate dialkyl ester, di(2-butyl-3,3-dimethyl) vinylbenzylphosphonate dialkyl ester, di(t-butyl) vinylbenzylphosphonate dialkyl ester, vinylbenzylphosphonic diacid, diethyl 2-(4-vinylphenyl) ethanephosphonate, 2-(acryloyloxy)ethylphosphonic acid dimethyl ester, 2-(methacryloyloxy)ethylphosphonic acid dimethyl ester, 2-(methacryloyloxy)methyl-phosphonic acid diethyl ester, 2-(methacryloyloxy)methylphosphonic acid dimethyl ester, 2-(methacryloyloxy)propylphosphonic acid dimethyl ester, 2-(acryloyloxy)methylphosphonic acid diisopropyl ester, 2-(acryloyloxy) ethylphosphonic acid diethyl ester, 2-(methacryloyloxy)ethylphosphonic acid, 2-(methacryloyloxy)methylphosphonic acid, 2-(methacryloyloxy)propylphosphonic acid, 2-(acryloyloxy)propylphosphonic acid, 2-(acryloyloxy)ethylphosphonic acid; vinylphosphonic acid, optionally substituted by cyano, phenyl, ester or acetate groups, vinylidenephosphonic acid the sodium salt thereof, the isopropyl ester thereof, or bis(2-ch loroethyl)vinylphosphonate.

4. The process as claimed in claim 2, wherein the monoethylenically unsaturated monomer is a styrene monomer, vinyl ester, neutral or charged hydrophilic acrylate, hydrophobic acrylate, neutral or charged hydrophilic methacrylate, hydrophobic methacrylate, hydrophilic or hydrophobic acrylamido derivatives, neutral or charged acrylamido derivatives, hydrophilic or hydrophobic methacrylamido derivatives, or neutral or charged methacrylamido derivatives.

5. The process as claimed in claim 1, wherein the polyethylenically unsaturated monomer is an organic compound reactive by the radical route comprising at least two ethylenic unsaturations and at most 10 ethylenic unsaturations.

6. The process as claimed in claim 5, wherein the polyethylenically unsaturated monomer is an acrylic, methacrylic, acrylamido, methacrylamido, vinyl ester, vinyl ether, diene, styrene, .alpha.-methylstyrene or allyl derivative.

7. The process as claimed in claim 1, wherein the polyethylenically unsaturated monomer further bears one or more functional groups other than ethylenic unsaturations selected from the group consisting of hydroxyl, carboxyl, ester, amide, amino, substituted amino, mercapto, silane, epoxy and halo functional groups.

8. The process of claim 1, wherein the polyethylenically unsaturated monomer is selected from the group consisting of divinylbenzene, vinyl methacrylate, methacrylic acid anhydride, allyl methacrylate, ethylene glycol dimethacrylate, phenylene dimethacrylate, diethylene glycol dimethacrylate, triethylene glycol dimethacrylate, tetraethylene glycol dimethacrylate, polyethylene glycol 200 dimethacrylate, polyethylene glycol 400 dimethacrylate, 1,3-butanediol dimethacrylate, 1,4-butanediol dimethacrylate, 1,6-hexanediol dimethacrylate, 1,12-dodecanediol dimethacrylate, 1,3-glycerol dimethacrylate, diurethane dimethacrylate or trimethylolpropane trimethacrylate; vinyl acrylate, bisphenol A epoxy diacrylate, dipropylene glycol diacrylate, tripropylene glycol diacrylate, polyethylene glycol 600 diacrylate, ethylene glycol diacrylate, diethylene glycol diacrylate, triethylene glycol diacrylate, tetraethylene glycol diacrylate, neopentyl glycol ethoxylate diacrylate, butanediol diacrylate, hexanediol diacrylate, aliphatic urethane diacrylate, trimethylolpropane triacrylate, trimethylolpropane ethoxylate triacrylate, trimethylolpropane propoxylate triacrylate, glycerol propoxylate triacrylate, aliphatic urethane triacrylate, trimethylolpropane tetraacrylate or dipentaerythritol pentaacrylate; vinyl crotonate, diethylene glycol divinyl ether, 1,4-butanediol divinyl ether or triethylene glycol divinyl ether; diallyl phthalate, diallyldimethylammonium chloride, diallyl maleate, sodium diallyloxyacetate, diallylphenylphosphine, diallyl pyrocarbonate, diallyl succinate, N,N'-diallyltartardiamide, N,N-diallyl-2,2,2-trifluoroacetamide, the allyl ester of diallyloxyacetic acid, 1,3-diallylurea, triallylamine, triallyl trimesate, triallyl cyanurate, triallyl trimellitate or 1,3,5-triallyltriazine-2,4,6(1H,3H,5H)-trione; N,N'-methylenebisacrylamide, N,N'-methylenebismethacrylamide, glyoxalbisacrylamide or diacrylamidoacetic acid; divinylbenzene and 1,3-diisopropenylbenzene; butadiene, chloroprene or isoprene.

9. The process as claimed in claim 1, wherein the polyethylenically unsaturated monomer is N,N'-methylenebisacrylamide, divinylbenzene, ethylene glycol diacrylate or trimethylolpropane triacrylate.

10. The process as claimed in claim 1, wherein the polyethylenically unsaturated monomers with respect to the monoethylenically unsaturated monomers are in a molar fraction of between 0.001 and 1.

11. The process as claimed in claim 10, wherein the molar fraction of polyethylenically unsaturated monomers with respect to the monoethylenically unsaturated monomers is between 0.01 and 1.

12. The process as claimed in claim 1, wherein the controlled radical polymerization is carried out according to a Atom Transfer Radical Polymerization (ATRP) process or by a reversible transfer by addition-fragmentation of thiocarbonylthio compounds process.

13. The process as claimed in claim 12, wherein the controlled radical polymerization is carried out according to a reversible transfer by addition-fragmentation of thiocarbonylthio compounds process.

14. The process as claimed in claim 13, wherein the thiocarbonylthio compounds are compounds of following formula (A):

wherein:
Z represents:
a hydrogen atom,
a chlorine atom,
an optionally substituted alkyl radical or an optionally substituted aryl radical,
an optionally substituted heterocycle,
an optionally substituted alkylthio radical,
an optionally substituted arylthio radical,
an optionally substituted alkoxy radical,
an optionally substituted aryloxy radical,
an optionally substituted amino radical,
an optionally substituted hydrazine radical,
an optionally substituted alkoxycarbonyl radical,
an optionally substituted aryloxycarbonyl radical,
a carboxyl or optionally substituted acyloxy radical,
an optionally substituted aroyloxy radical,
an optionally substituted carbamoyl radical,
a cyano radical,
a dialkyl- or diaryl-phosphonato radical,
a dialkyl-phosphinato or diaryl-phosphinato radical,
or a polymer chain, and
$R_1$ represents:
an optionally substituted alkyl, acyl, aryl, aralkyl, alkenyl or alkynyl group, an optionally substituted, aromatic, saturated or unsaturated, carbon ring or heterocycle, or a polymer chain.

15. The process as claimed in claim 12, wherein the thiocarbonylthio compounds are xanthate, dithiocarbamate or dithioester compounds carrying a single functional group of formula —S(C=S)—.

16. The process as claimed in claim 15, wherein the compounds are xanthates.

17. A process for the preparation of second-generation random microgels, comprising the steps of:
1) preparing a first-generation random microgel wherein said preparation comprises a step of controlled radical polymerization of a composition comprising at least one monoethylenically unsaturated monomer, at least one polyethylenically unsaturated monomer, a source of free radicals, and a control agent, and
2) adding at least one mono- or polyethylenically unsaturated monomer to the microgel obtained in step 1) in the presence of an activator;
wherein said first generation random microgels comprise a polymer having chain ends which can be activated by reversible transfer or by termination, said polymer comprising one or more thiocarbonylthio groups and said second generation random microgels comprise a core of a first generation random microgel and polymer arms extending from the chain ends which can be activated by the central portion.

18. A process for the preparation of nth-generation random microgels, n being an integer between 3 and 50, comprising the steps of:
a) preparing a first-generation random microgel, wherein said preparation comprises a step of controlled radical polymerization of a composition comprising at least one monoethylenically unsaturated monomer, at least one polyethylenically unsaturated monomer, a source of free radicals, and a control agent, b) preparing an 2nd generation random microgel by adding, in the presence of an activator, at least one mono- or polyethylenically unsaturated monomer to the first-generation microgel obtained in step a) in the presence of an activator to form a 2nd generation random microgel;

c) preparing a next generation random microgel by adding in the presence of an activator at least one mono- or polyethylenically unsaturated monomer to the previous generation random microgel, where the step is performed n–2 times to form and (n–1)th generation random microgel; and d) preparing an nth generation random microgel by adding in the presence of an activator at least one mono- or polyethylenically unsaturated monomer to the (n–1)th generation random microgel obtained at the end of step c) in the presence of an activator.

19. The process as claimed in claim 17, wherein the activator is a source of free radicals.

20. The process as claimed in claim 17, wherein the monomer(s) used in step 2 is or are (a) monoethylenically unsaturated monomer(s) in order to obtain a star-shaped polymer.

21. The process as claimed in claim 18, wherein the monomer(s) used in step n is or are (a) monoethylenically unsaturated monomer(s) in order to obtain a star-shaped polymer.

22. The process as claimed in claim 21, wherein the star-shaped polymer exhibits (1) a central portion in the form of a first-generation microgel based on a crosslinked polymer resulting from the polymerization of the mono- and polyethylenically unsaturated monomers and (2) arms composed of the monoethylenically unsaturated monomers only added starting from step 2 and comprising, at their end, an active part of the control agent (—S(C=S)— functional group), in the case of a controlled radical polymerization process of reversible transfer by addition-fragmentation of thiocarbonylthio compounds type, or the halogen or pseudohalogen part, in the case of a controlled radical polymerization ATRP process.

23. The process as claimed in claim 22, wherein the active part of the control agent (—S(C=S)— functional group) is substituted in all or part by a hydrogen atom or a thiol functional group.

* * * * *